(12) United States Patent
Prout

(10) Patent No.: US 10,407,243 B1
(45) Date of Patent: Sep. 10, 2019

(54) ASRS ROBOT SUPPORT APPARATUS

(71) Applicant: Andrew Prout, Edmonds, WA (US)

(72) Inventor: Andrew Prout, Edmonds, WA (US)

( * ) Notice: Subject to any disclaimer, the term of this patent is extended or adjusted under 35 U.S.C. 154(b) by 0 days.

(21) Appl. No.: 15/801,275

(22) Filed: Nov. 1, 2017

(51) Int. Cl.
*B65G 1/137* (2006.01)
*B65B 1/04* (2006.01)
*B65G 47/22* (2006.01)
*B65G 1/04* (2006.01)
*B65G 1/20* (2006.01)

(52) U.S. Cl.
CPC ......... *B65G 1/1373* (2013.01); *B65G 1/0492* (2013.01); *B65G 1/20* (2013.01); *B65G 47/22* (2013.01)

(58) Field of Classification Search
CPC .... B65G 1/1373; B65G 1/0492; B65G 47/22; B66F 9/127
See application file for complete search history.

(56) References Cited

U.S. PATENT DOCUMENTS

| | | | | |
|---|---|---|---|---|
| 5,383,758 A | * | 1/1995 | Patrick | B66F 9/061 414/10 |
| 9,592,759 B1 | * | 3/2017 | Theobald | B65G 1/0492 |
| 9,785,911 B2 | * | 10/2017 | Galluzzo | B25J 5/007 |
| 9,940,604 B2 | * | 4/2018 | Galluzzo | B25J 5/007 |
| 2009/0084927 A1 | * | 4/2009 | Nihei | B25J 9/08 248/674 |
| 2013/0236285 A1 | * | 9/2013 | Maurissen | B66F 9/183 414/800 |
| 2018/0065806 A1 | * | 3/2018 | Sugahara | B65G 1/0492 |
| 2018/0250861 A1 | * | 9/2018 | Ohshiro | B29C 45/42 |
| 2018/0293536 A1 | * | 10/2018 | Galluzzo | B25J 5/007 |

OTHER PUBLICATIONS

NASA—Farming for the Future, website located at <https://www.nasa.gov/missions/science/biofarming.html>, page last updated on Nov. 22, 2007, retrieved on May 8, 2019.
AFT—About AFT—Automated Fork Truck Systems—Automated Storage and Retrieval Systems—AS/RS, website located at <http://www.asrs.net/about_aft.php>, published on Jan. 17, 2016, retrieved from <https://web.archive.org/web/20160117225317/http://www.asrs.net/about_aft.php> on May 8, 2019.

(Continued)

*Primary Examiner* — Kaitlin S Joerger
(74) *Attorney, Agent, or Firm* — Hanrahan Law Firm, P.A.; Benjamin M. Hanrahan

(57) ABSTRACT

A support apparatus or sled for receiving an operations device operated in connection with an automated storage and retrieval system (ASRS) is presented herein. The apparatus includes a body with two parallel receiving channels for receiving forks or prongs of an ASRS lift module. The apparatus further includes a receiving area defined on a top surface of the body that is structured to receive and at least partially support a robotic operations device therein. The operations device of at least one embodiment may be configured to perform one or more various tasks or functions in connection with the ASRS. One or more ports or connections may be included as part of the support apparatus in order to directly or indirectly connect the operations device to a main controller, computer, or to provide power to the operations device.

13 Claims, 6 Drawing Sheets

(56) References Cited

OTHER PUBLICATIONS

AFT—Our Machines—Automated Fork Truck Systems—Automated Storage and Retrieval Systems—AS/RS, website located at <http://asrs.net/our_machines.php>, published on Jan. 19, 2016, retrieved from <https://web.archive.org/web/20160118115101/http://asrs.net/our_machines.php> on May 8, 2019.
ASRS System—Mini-Load—Automated Storage and Retrieval Systems, website located at <http://www.unarcorack.com/asrs-systems-details/mini-load-asrs-system/>, published on Jul. 22, 2016, retrieved from <https://web.archive.org/web/20160722112847/http://www.unarcorack.com/asrs-systems-details/mini-load-asrs-system!> on May 8, 2019.
Vertical Farming—Wikipedia, website located at <https://en.wikipedia.org/wiki/Vertical_farming>, publication date unknown, retrieved on Apr. 21, 2017.
Hydroponic Robot Farming Goes Live | Garden Culture Magazine, website located at <https://gardenculturemagazine.com/techno-gardens/hydroponics/hydroponic-robot-farming-goes-live/>, dated Feb. 5, 2016, retrieved on May 7, 2019.
Aerofarms—A Farm Grows in the City | Wall Street Journal, website located at <https://aerofarms.com/2017/05/15/farm-grows-city/>, dated May 14, 2017, retrieved on May 7, 2019.
Aerofarms—Celebrating National Agriculture Day; Today and Everyday, website located at <https://aerofarms.com/2018/03/20/celebrating-national-agriculture-day-today-everyday/>, date unknown, retrieved on May 7, 2019.
Aerofarms—IKEA and Top Chef David Chang Round Out Financing for $40 Million Series D Round, website located at <https://aerofarms.com/2017/10/26/ikea-top-chef-david-chang-round-financing-40-million-series-d-round/>, date unknown, retrieved on May 7, 2019.
Your Greens Might Soon Be Grown in Warehouses | National Geographic, website located at <https://news.nationalgeographic.com/2017/08/chasing-genius-bowery-farms-indoor-agriculture/>, dated Aug. 11, 2017, retrieved on May 7, 2019.
Image | National Geographic, obtained from website located at <https://news.nationalgeographic.com/2017/08/chasing-genius-bowery-farms-indoor-agriculture/>, dated Aug. 11, 2017, retrieved on May 7, 2019.
What It's Really Like Inside Bowery Farming, a Vertical Farm on the Rise | Food & Wine, a website located at <https://www.foodandwine.com/news/bowery-farming>, dated Apr. 18, 2018, retrieved on May 7, 2019.
This Automated Indoor Farm Is Growing So Fast, It Makes You Think This Thing Might Work | FastCompany, a website location at <https://www.fastcompany.com/90239250/bowerys-automated-indoor-farm-is-growing-fast>, dated Sep. 24, 2018, retrieved on May 7, 2019.
How Indoor Farming Is Making It Easier to Eat Locally Grown, Pesticide-Free Food | Well + Good, website located at <https://www.wellandgood.com/good-food/indoor-vertical-farming-bowery/>, dated Sep. 28, 2018, retrieved on May 7, 2019.
Ubber CEO and Alphabet Invest in Urban Farming Startup | Bloomberg, website located at <https://www.bloomberg.com/news/articles/2018-12-12/uber-ceo-and-alphabet-invest-in-urban-farming-startup>, dated Dec. 12, 2018, retrieved on May 7, 2019.
A Google-Backed Vertical Farm Startuo Just Raised Another $90 to Build in Cities Across the US | Business Insider, website located at <https://www.businessinsider.de/bowery-farm-90-million-raise-food-google-2018-12>, dated Dec. 13, 2018, retrieved on May 7, 2019.

\* cited by examiner

ASRS ROBOT SUPPORT APPARATUS

FIELD OF THE INVENTION

The present invention is generally directed to Automated Storage and Retrieval Systems (ASRS) and in particular, to an apparatus that can be used to support an operations device or robot that can perform various functions or tasks in connection with an ASRS.

BACKGROUND OF THE INVENTION

An Automated Storage and Retrieval System or ASRS is a computer-controlled system or device that operates to automatically perform tasks or functions at defined storage areas, typically in warehouses, such as high-volume warehouses, that may be part of a supply chain or package delivery system. For example, an ASRS may be used in warehouses or locations where there is a high volume of packages, products, or loads being moved into and/or out of the location, or in which storage density and space is an important concern.

As part of the ASRS, a lift module or retrieval module may be used in order to access various pods or units stored in the warehouse or other location. The lift module may be a computer-controlled or manually-operated device that can access a number of different pods or products that may be disposed or stored in different locations, such as, but not limited to, on a shelving unit. In many cases, the lift module is used to simply retrieve and store products or pods on the shelving unit in the warehouse. In this manner, the lift module often includes a pair of forks, similar to the forks of a forklift, that correspondingly engage or fit into receiving channels of a pod stored on the shelving unit.

However, it is contemplated that an ASRS system can be used to operate or control certain aspects of vertical farming or other more complicated systems that may require more than just storing and retrieving pods from a shelving unit. Particularly, vertical or indoor farming is referred to as the practice of producing food or growing plants in a vertically stacked manner, such as, by stacking or placing plants on shelves often within large structures or areas including, but not limited to buildings, warehouses, shipping containers, etc. Advantageously, when a vertical (or other) farming system is incorporated or constructed indoors, many of the environment factors (such as sunlight, temperature, gases, humidity, fluid, water, etc.) can be controlled. This is often referred to as controlled environment agriculture (CEA).

However, it should be noted that maintaining plants in a large-scale vertical farming system can be quite challenging. As an example, manual access to the plants for regular check-ups, pruning, harvesting, watering, or even re-planting, can be difficult. This is especially true for areas that are extremely large scale, such as in sky scrapers, for example, and in vertical or indoor farming systems that may have a large number of plants per area (e.g., high density farming).

Accordingly, there is a need in the art for an apparatus that can be incorporated into an ASRS which can support or interconnect with one or more robots or other operations devices. The robot or operations device could be used to perform various tasks or functions at the pod locations, including, but in no way limited to monitoring the plant(s), harvesting the plant(s), watering the plant(s), checking on the plant(s), etc.

The operations device and proposed apparatus may also be used on other environments or other Automated Storage and Retrieval Systems (e.g., other than vertical farming or indoor farming) that may require various functions or tasks to be performed at the pod locations.

SUMMARY OF THE INVENTION

Accordingly, the present invention is directed to a support apparatus or sled for receiving or connecting to an operations device operated in connection with an automated storage and retrieval system (ASRS). The support apparatus of at least one embodiment of the present invention includes a body with two parallel engagement portions or receiving channels for receiving forks or prongs of an ASRS lift module. The lift module may be used to raise, lower or otherwise position the support apparatus in various locations throughout the ASRS for access to one or more pods stored therein.

For instance, the support apparatus further includes a receiving area or a recess defined on a top surface of the body. The receiving area is structured and/or otherwise adapted to receive and at least partially support the operations device or robot therein. The operations device of at least one embodiment may be configured to perform one or more various tasks or functions in connection with the ASRS, such as retrieving products, maintaining or checking plants, watering plants, harvesting plants, etc.

One or more ports or connections may be included as part of the support apparatus in order to directly or indirectly connect the operations device to a main controller or computer and/or to provide power or electrical connections to the operations device. In one embodiment, the apparatus includes one or more ports or connections within the receiving area which will directly connect with the operations device, and at least one external port or connection that will connect with or to the main computer and/or an external power source.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

As shown in the accompanying drawings, the present invention is directed to a support apparatus, generally referenced as 10, used in connection with or as part of an Automated Storage and Retrieval System (ASRS). In particular, an ASRS is a computer-controlled system or systems that operates to automatically perform tasks or functions at defined storage areas, typically in warehouses such as high-volume warehouses that may be part of a supply chain or package delivery system. For example, an ASRS may be used in warehouses or locations where there is a high volume of packages, products, or loads being moved into and/or out of the location, or in which storage density and space is an important concern.

Figure 4:
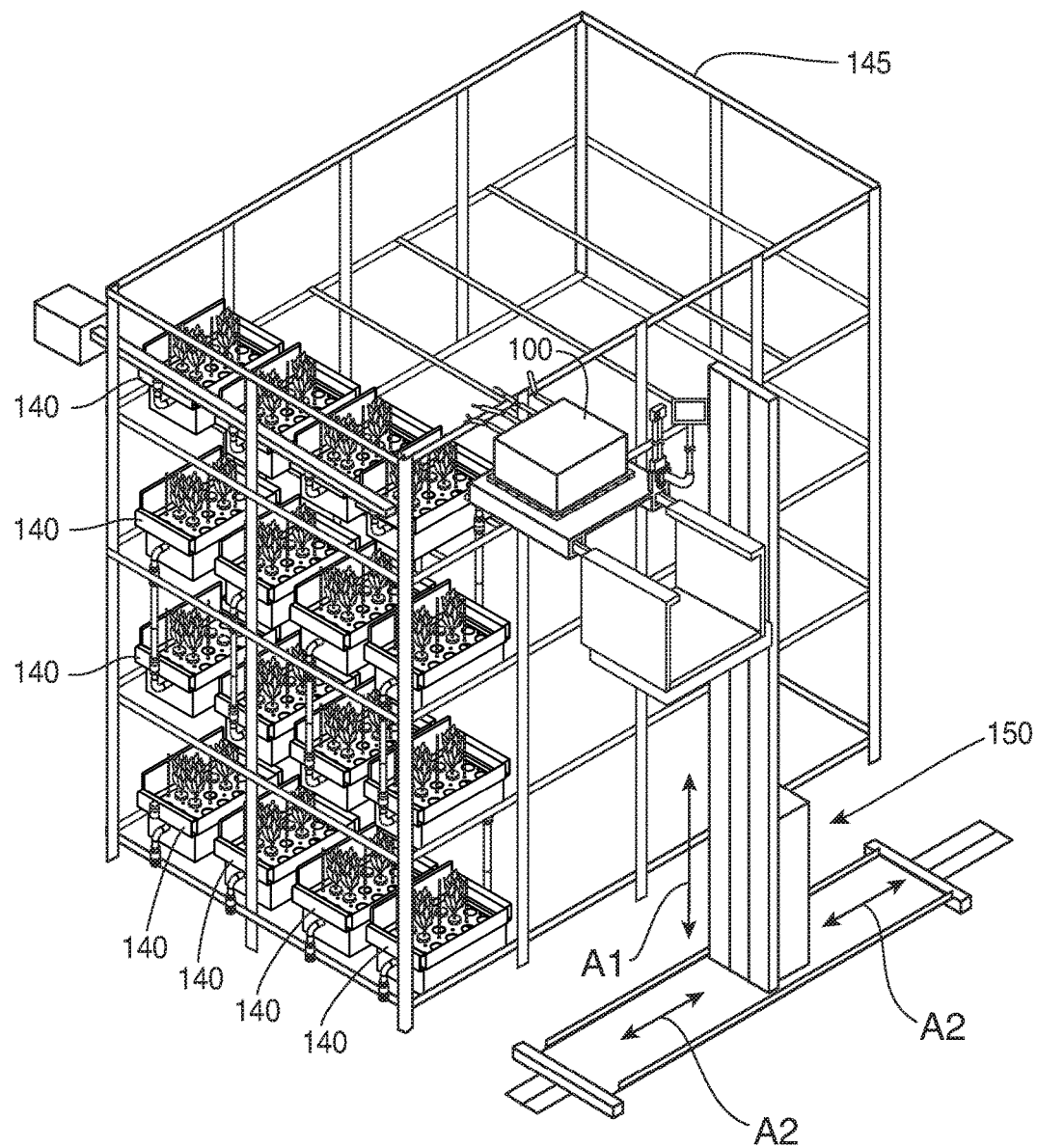
FIG. 4 is a perspective illustration of an Automated Storage and Retrieval System ASRS system and the support apparatus operated within a vertical farming environment.

As part of the ASRS, a lift module, generally referenced as 150 in FIG. 4, may be used to facilitate the operation of the ASRS, such as, for example, in order to access various pods or units stored in the warehouse or other location. The lift module 150 may be a computer-controlled device that can access a number of different pods or products that may be disposed or stored in different locations, such as, but not limited to, on a shelving unit 145. In many cases, the lift module 150 is used to simply retrieve and store products or pods on the shelving unit in the warehouse by virtue of moving vertically (for example, via arrow A1) and/or horizontally (for example, via arrows A2). In this manner, the lift module 150 often includes a pair of forks, similar to the forks of a forklift, that correspondingly engage or fit into receiving channels of a pod stored on the shelving unit.

The support apparatus 10 of the present invention is structured to operate in connection with an ASRS, and in some cases, can be engaged or supported by a lift module 150. In particular, the apparatus 10 of at least one embodiment includes a body 20, a receiving area 30 disposed on a top surface of the body 20, one or more receiving channels or engagement portions 60A, 60B, at least one operations port 40A, 40B, and at least one external port 50A, 50B. As described herein, a robotic operations device, generally referenced as 100, can be disposed or positioned within the area 30 of the body 20 and connected to port(s) 40A, 40B. With the apparatus 10 engaged or supported by the lift module 150 of the ASRS, the operations device 100 can be used to perform various tasks or functions within the ASRS, and in particular, at the pod locations throughout the ASRS.

Specifically, with reference to FIGS. 1A through 1D, the body 20 of at least one exemplary embodiment includes a generally box-shaped or rectangular configuration with one or more engaging portions or receiving channels 60A, 60B with open ends 62A, 62B disposed on or otherwise facing a rear portion 22 of the body 20. As illustrated, the channels 60A, 60B are disposed on or at least partially through or along the body 20 in a parallel or substantially parallel manner beginning at or near the rear portion 22 of the body 20 and extending toward the opposite end or front portion 24. In this manner, the channels 60A, 60B are structured and configured to receive forks or prongs of a lift module 150, such as a forklift or other device used in connection with an ASRS. The forks, prongs or other supporting or engaging devices will therefore slide into the channels 60A, 60B, through the open ends thereof 62A, 62B in a manner to support or lift the apparatus 10. Other engaging portions, channels or mechanisms can be used in connection with other embodiments of the present invention in order to engage with or be engaged by a lift module 150 or other structure or device of an ASRS.

Furthermore, in at least one embodiment, the body 20 includes a receiving area 30, which in many cases, is on the top or upper, exposed surface 25 of the body 20, however, other locations are contemplated within the scope of other embodiments. In particular, the receiving area 30 of at least one embodiment includes a recess or area that is structured to receive and at least partially support one or more operations devices 100 therein. In the embodiment illustrated, the receiving area 30 or recess is defined by a surrounding or raised wall 32 that completely surrounds or otherwise defines the outer periphery of the receiving area 30. For instance, the wall 32 projects upward from the top or upper, exposed surface 25 of the body 20, thereby defining the receiving area 30 therein. In this manner, the receiving area 30 may be defined by the inner surface(s) of the wall(s) 32 and the top or upper surface 25 of the body 20 which the wall 32 surrounds.

In the illustrated embodiment, the operations device 100 includes a lower base 102 that is structured to fit at least partially within the receiving area 30. Specifically, the base 102 or lower portion of the operations device 100 may include a square or rectangular shape which fits tightly or neatly within the square or rectangular shaped receiving area 30. Of course, other shapes, sizes, and configurations of the base 102 of the operations device 100 and the receiving area 30 are contemplated within the full spirit and scope of the present invention.

Additional securing mechanisms (not shown) such as clips, snaps, mating notches/channels, etc. can be incorporated into the receiving area 30, the body 20, and/or the operations device 100 in order to further securely connect or engage the operations device 100 to the body 20. In addition, the wall 32 of some embodiments may not necessarily completely surround the receiving area 30, as is illustrated in the Figures. For example, the receiving area 30 may be defined by a plurality of walls or sections of walls, or in some embodiments, one or more channels, clips, snaps, etc. In other words, some embodiments may not need or use any walls 32 to define the receiving area upon which the operations device 100 is connected or supported.

Figure 1A:
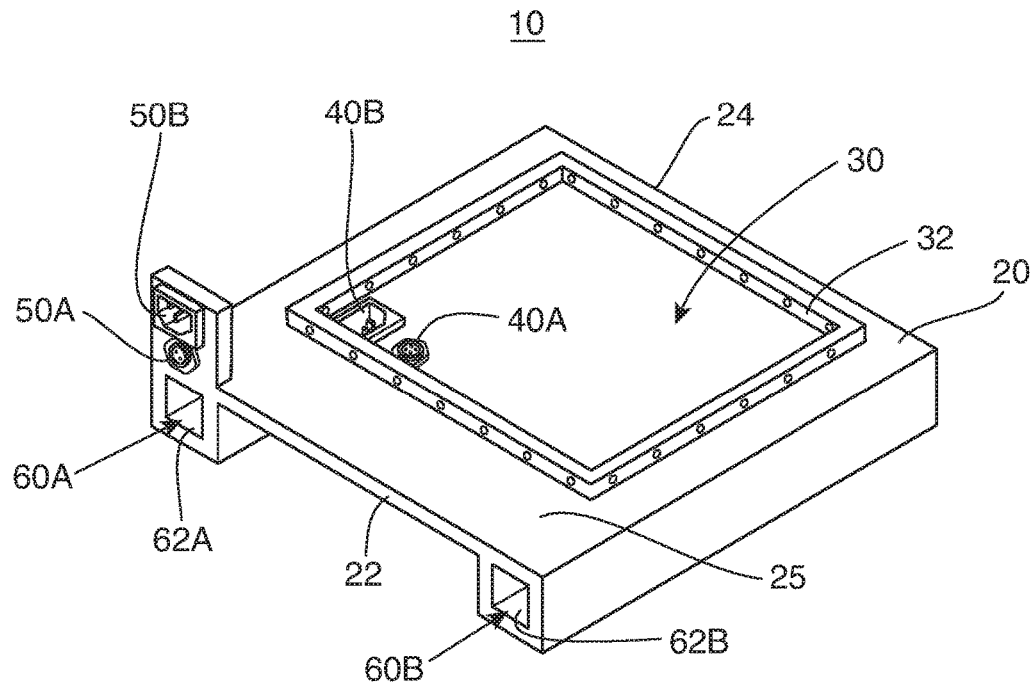
FIG. 1A is a top-rear perspective view of the support apparatus as disclosed in accordance with at least one embodiment of the present invention.
Figure 1B:
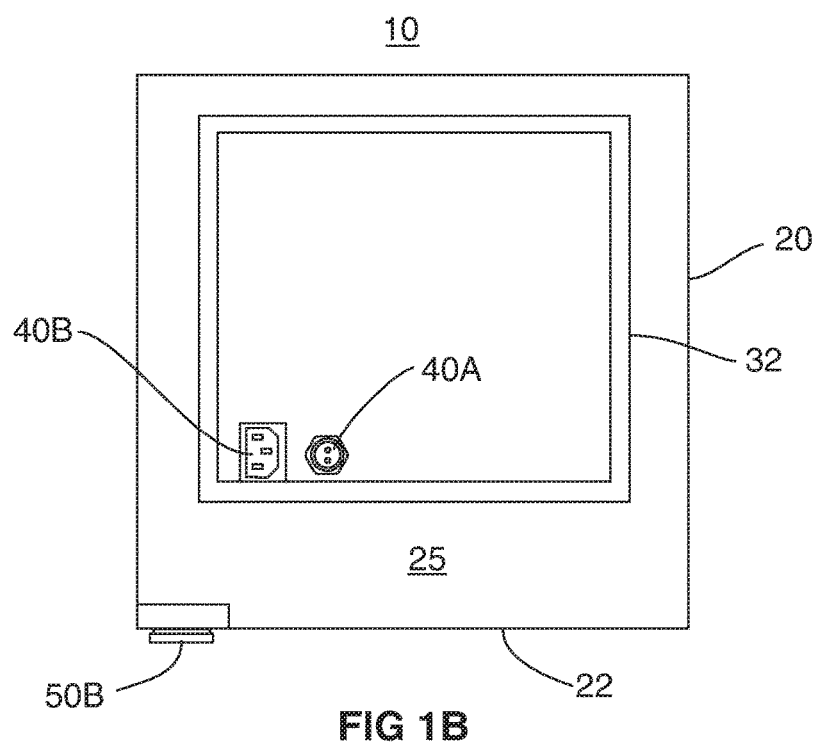
FIG. 1B is a top plan view of the support apparatus illustrated in FIG. 1A.
Figure 1C:
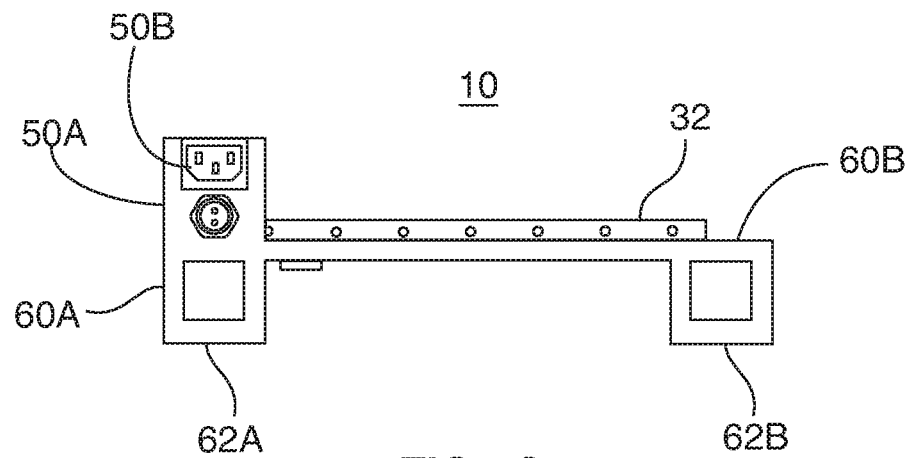
FIG. 1C is a rear plan view of the support apparatus illustrated in FIG. 1A.
Figure 1D:
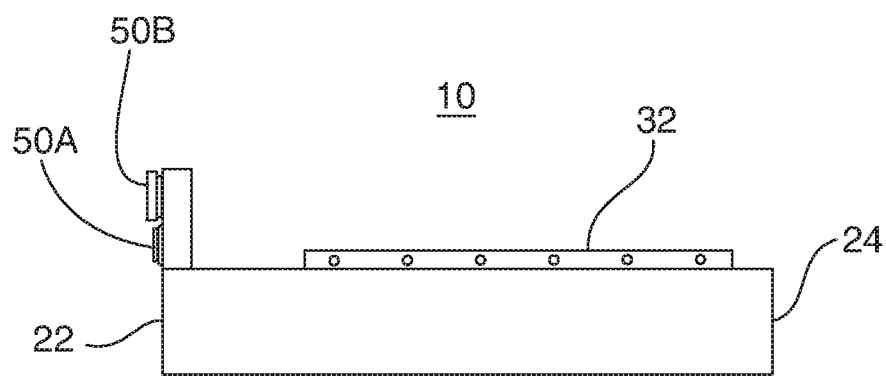
FIG. 1D is a left side plan view of the support apparatus illustrated in FIG. 1A.
Figure 2:
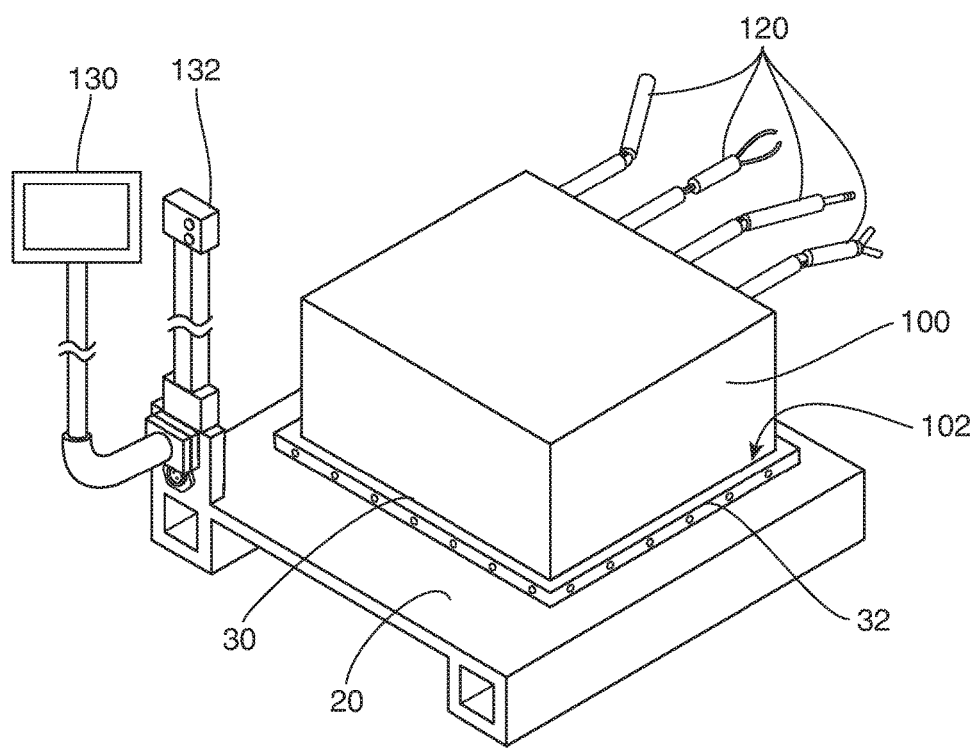
FIG. 2 is a rear perspective view of the support apparatus and an exemplary operations device connected thereto in accordance with at least one embodiment of the present invention.

With reference now to FIG. 2, an exemplary operations device 100 is shown as being installed or connected to the apparatus 10, such as, within the receiving area 30. It should be noted that the operations device 100, as used herein, can include any computer-controlled or manual-controlled device that is operable to perform one or more functions or tasks within an automated storage and retrieval system (ASRS). For example, the operations device 100 may include one or more arms 120 that extend out from a body or base. These arms 120 can be used to operate or perform the functions or tasks, for example, at one or more pods or storage bins located upon a shelving unit of an ASRS. For instance, in some cases, the arms 120 may include ends or tips 122 that can facilitate the performance of various functions or tasks within the ASRS. The tips or ends may include, but are certainly not limited to clamps, claws, water or fluid sprayers, etc.

Particularly, in the case of a storage warehouse, the operations device 100 and/or the one or more arms 120 thereof, can be used to grab, move, rotate, check, monitor, etc. the package(s), product(s), item(s), etc. that may be stored or located at a particular spot or within a bin or pod.

It is contemplated that in some instances, the apparatus and ASRS can be implemented in vertical farming or mass indoor farming environments. In such a case, the ASRS can operate to perform various functions or tasks on plants that may be stored or growing in the ASRS. In particular, the operations device 100 and/or the one or more arms 120 thereof may be used to monitor, water, check, or harvest plants maintained in a vertical farming or mass indoor farming environment.

As mentioned herein, the operations device 100 may be computer-controlled in that is may perform various functions automatically, on a schedule, or in response to various sensors, for example. In this manner, the operations device 100 can be considered a robot or other device capable of performing a set or series of tasks or functions automatically and/or autonomously. In other embodiments, the operations device 100 may be at least partially manually operated in that it may operate at the direction of a user.

In any event, the operations device 100 of some embodiments may be connected to a controller or computer 130 that sends commands to the operations device 100 and/or receives information or data from the operations device 100. In this manner, the operations device 100 may be interconnected directly to the controller or computer 130. This connection may be a data connection, such as via a fiber optic cable, RJ45 cable, USB cable, etc. In some embodiments, the operations device 100 may be wirelessly connected to the controller or computer 130, for example, via Wifi, Bluetooth, Internet, World Wide Web, or other wireless data or communication connections.

Figure 3A:
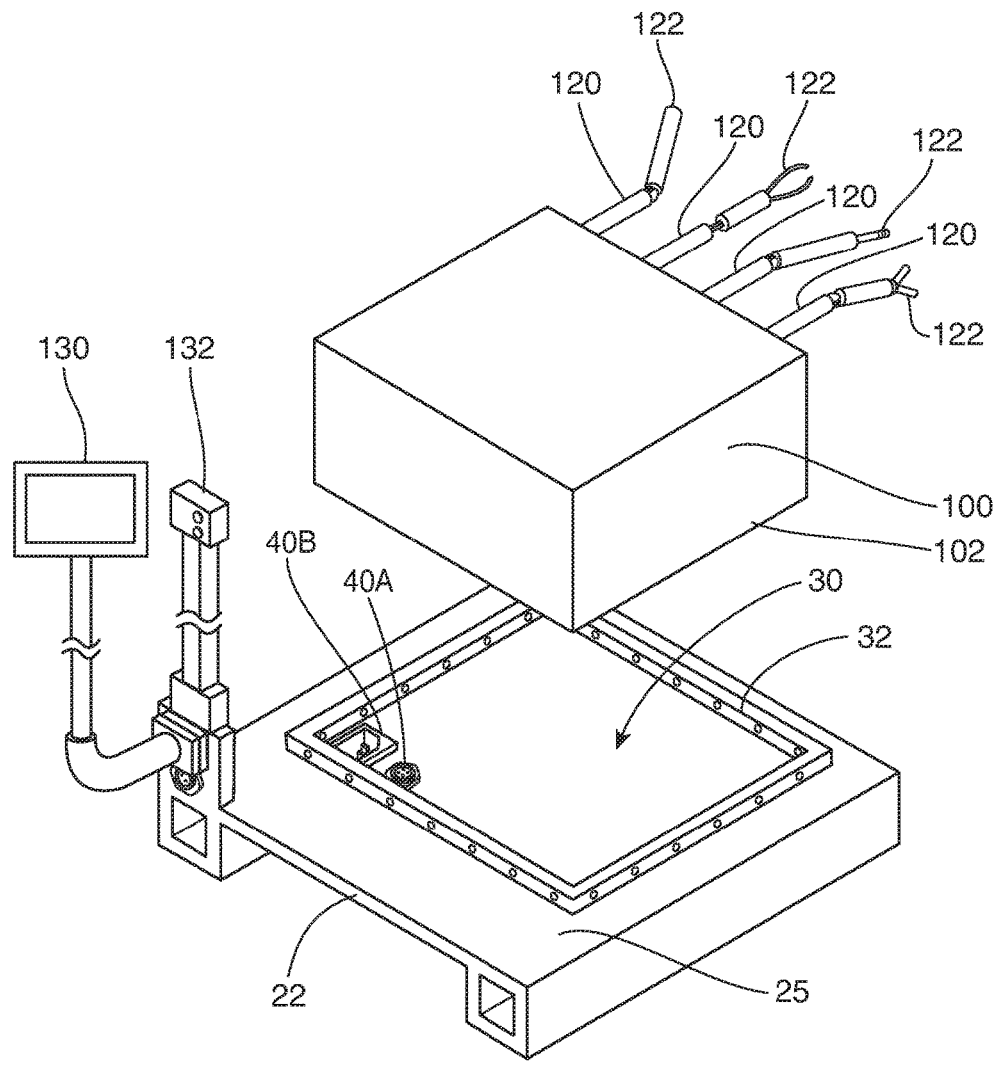
FIG. 3A is an exploded view of the support apparatus and an exemplary operations device as disclosed in accordance with at least one embodiment of the present invention.
Figure 3B:
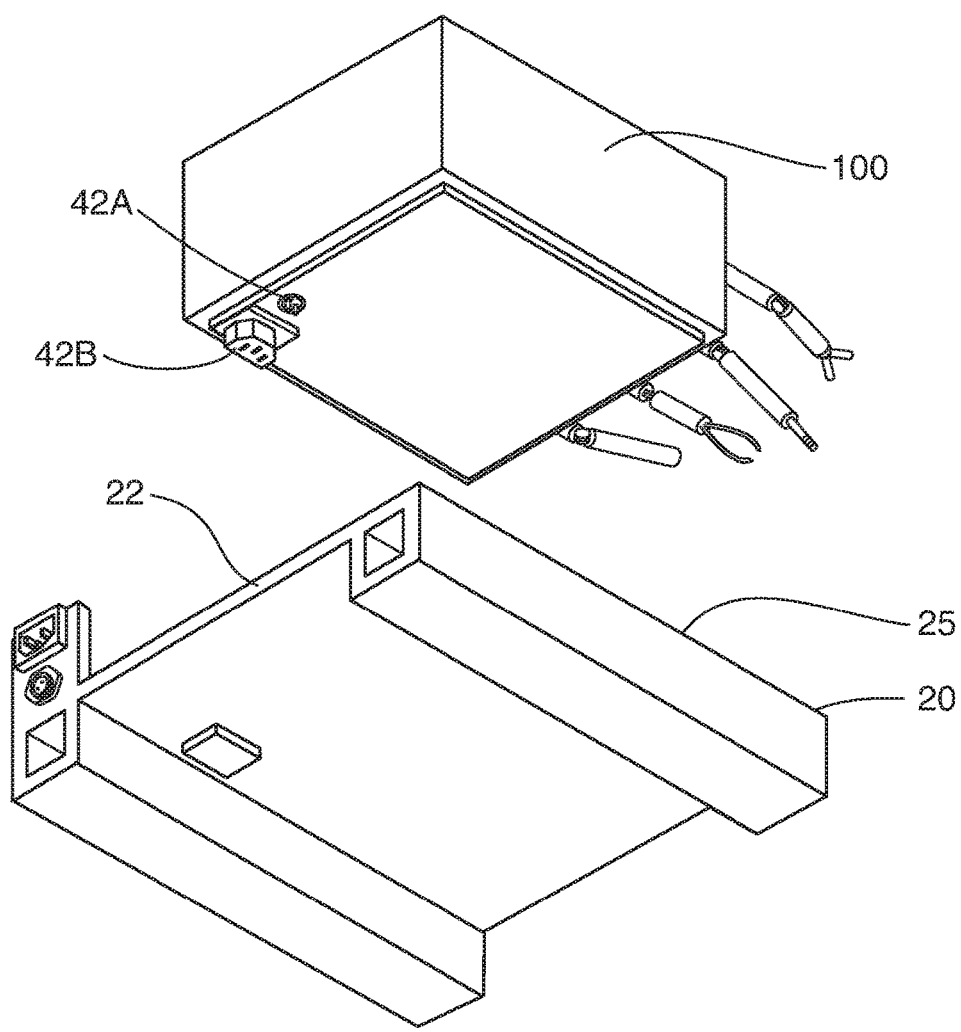
FIG. 3B is another exploded view of the support apparatus and an exemplary operations device as disclosed in accordance with at least one embodiment of the present invention.

In at least one embodiment, as illustrated in FIGS. 3A and 3B, however, the operations device 100 may interconnect directly to the apparatus 10, which may in turn, interconnect with the computer or controller 130. Accordingly, the apparatus 10 of at least one embodiment may include one or more operations ports or connections 40A, 40B to which the operations device 100 will directly connect. In some cases, only on operations port or connection may be needed, for example, to provide power to the operations device 100 and to provide a data link between the controller or computer 130. In addition, it is contemplated that in some embodiments, the operations device 100 may obtain power via one or more batteries or battery packs, in which case, only a data connection or data link is needed.

In the embodiment illustrated in FIGS. 3A and 3B, for example, the apparatus 10 includes two operations ports or connections 40A, 40B—one port/connection 40A to provide a data link or data connection with the computer or controller 130, and another port/connection 40B to provide power to the operations device 100. Accordingly, operations port/connection 40A may be a port or connection structured to correspondingly receive a fiber optic cable, RJ45 cable, USB cable, or other known or proprietary data cable or connection. Operations port/connection 40B may be a port or connection capable of connecting with a power cable or otherwise providing power to the operations device.

Therefore, still referring to FIGS. 3A and 3B, the operations device 100 includes one or more connections, generally referenced as 42A, 42B, that is/are capable of connecting with the operations port(s)/connection(s) 40A, 40B of at least one embodiment of the present invention. As illustrated, the operations port(s)/connection(s) 40A, 40B may be disposed within the receiving area 30 of the body 20. In this manner, when the operations device 100 is positioned within the receiving area 30, the connections 42A, 42B on the operations device 100 will correspondingly interconnect with the operations port(s)/connection(s) 40A, 40B of the apparatus 10. In other embodiments, however, the operations port(s)/connection(s) 40A, 40B can be disposed elsewhere, for example, external to the receiving area 30. It should also be noted that the operations port(s)/connection(s) 40A, 40B may be in the form of a flexible or positionable cable or other connection that interconnects with ports on the operations device 10.

In any event, the operations port(s)/connection(s) 40A, 40B of at least one embodiment are interconnected to one or more external ports or connections 50A, 50B, which are in turn interconnected to the computer or controller, generally referenced as 130, and/or an external power source, generally referenced as 132. Particularly, in at least one embodiment, the apparatus 10 includes at least one external port/connection 50A, such as a data port or cable, that interconnects with the computer or controller 130, for example, via a fiber optic cable/connection, RJ45 cable/connection, USB cable/connection, or other known or proprietary data connection. This allows the controller or computer 130 to communicate with the operations device 100 in order to provide commands and/or receive data. On other embodiments, it is contemplated that the support apparatus 10 may communication with a controller or computer 130 via wireless communication, including, but in no way limited to WiFi, Bluetooth, Internet, World Wide Web, etc.

As shown in the embodiments of FIGS. 3A and 3B, for example, another external port 50B may be used to interconnect the apparatus 10, and therefore, the operations device 100, to an external power source. It should be noted again, however, that a single port or connection 50A/40A can be used to provide both a data connection and power to the operations device 100.

With reference now to FIG. 4, the apparatus 10 of at least one embodiment is shown incorporated in to an automated storage and retrieval system (ASRS) in that it is secured to or engaged by the lift module 150. For instance, a number of products, items, plants, or pods, generally referenced as 140, may be retained or supported by a framing or shelving system as shown by reference character 145. The framing or shelving system 145 may include a plurality of vertically oriented levels such that one or more of the various pods 140 can be stacked or otherwise positioned above or below other pods 140. In the case of a horticultural, hydroponic, or aquaponic system, for example, the pods 140 may be fluidically interconnected to one other via input and/or output couplers and/or intermediate hoses, pipes, or other like connections.

As provided hereon, the ASRS system exemplified in FIG. 4 may include a computer-controlled system for automatically performing tasks or functions at the various pods or storage locations. This may include maintaining, checking, harvesting, monitoring, retrieving, or storing one or more plants or products, for example. For instance, the ASRS may include a retrieval device or lift module 150 for engaging the apparatus 10 of the present invention via one or more forks, prongs or other like devices. An operations device 100, such as a robot or other computer-controlled device may be connected to the apparatus for performing various tasks or functions within the ASRS.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A support apparatus for receiving an operations device operated in connection with an automated storage and retrieval system, the automated storage and retrieval system comprising an automated lifting module and a plurality of pods, the plurality of pods being configured to retain plant life therein, said support apparatus comprising:
a body,
a raised wall defining a recessed receiving area on a top surface of said body, the operations device being disposable within said recessed receiving area,
at least two parallel receiving channels disposed at least partially through a portion of said body, said at least two parallel receiving channels comprising open ends facing a rear portion of said body, each of said at least two parallel receiving channels being structured to receive a prong from the automated lifting module therein,
wherein the operations device is disposed into communicative relation with the plurality of pods and the plant life retained within the plurality of pods via said automated lifting module,
at least one operations port disposed on said body and structured to connect with the operations device,
at least one external port disposed on said body and structured to connect with an external device, and
said at least one operations port and said at least one external port being interconnected to one another to connect the operations device to the external device.

2. The support apparatus as recited in claim 1 wherein said at least one operations port is disposed within said receiving area.

3. The support apparatus as recited in claim 2 further comprising at least two operations ports, wherein one of said at least two operations ports comprises an electrical port for providing power to the operations device, and wherein another one of said at least two operations ports comprises a data port.

4. The support apparatus as recited in claim 3 further comprising at least two external ports, wherein one of said at least two external ports comprises an electrical port connectable to an external power source, and wherein another one of said at least two external ports comprises a data port connectable to a controller.

5. The support apparatus as recited in claim 4 wherein the operations device comprises an automated robot operable to perform at least one function at a storage location in the automated storage and retrieval system.

6. A support apparatus for receiving an operations device operated in connection with an automated storage and retrieval system, said apparatus comprising:
a body,
a receiving area comprising a recess defined on a top surface of said body, said recess of said receiving area being structured to receive and at least partially support at least a portion of the operations device,
the automated storage and retrieval system comprises a hydroponic system with a lifting module and a plurality of storage locations fluidically interconnected to one another, the plurality of storage locations comprising plant life disposed therein,
at least one engagement portion disposed on said body, said engagement portion being configured to be engaged by the lift module, wherein the operations device is disposable in an accessible relation to said plurality of storage locations and the plant life disposed therein while said engagement portion is engaged by the lift module,
at least one operations port disposed on said body, said at least one operations port being structured to connect with the operations device,
at least one external port disposed on said body and structured to connect with an external device, and
said at least one operations port and said at least one external port being interconnected to one another to connect the operations device to the external device.

7. The support apparatus as recited in claim 6 wherein the lift module comprises at least one prong, said engagement portion of said body being configured to receive the at least one prong of the lift module therein.

8. The support apparatus as recited in claim 7 wherein said engagement portion of said body comprises at least two parallel receiving channels, said at least two parallel receiving channels comprising open ends facing a rear portion of said body.

9. The support apparatus as recited in claim 8 wherein each of said at least two parallel receiving channels are cooperatively structured to receive a portion of the lift module therein.

10. The support apparatus as recited in claim 9 wherein said at least two parallel receiving channels are disposed along a portion of said body.

11. The support apparatus as recited in claim 10 wherein said recess of said receiving area is defined by at least one raised wall disposed on said body.

12. The support apparatus as recited in claim 11 further comprising at least two operations ports disposed within said receiving area, wherein one of said at least two operations ports comprises an electrical port for providing power to the operations device, and wherein another one of said at least two operations ports comprises a data port.

13. The support apparatus as recited in claim 12 further comprising at least two external portions, wherein one of said at least two external ports comprises an electrical port connectable to an external power source, and wherein another one of said at least two external ports comprises a data port connectable to a controller.

* * * * *